(12) United States Patent
Bouzit-Benbernou

(10) Patent No.: US 9,305,212 B2
(45) Date of Patent: Apr. 5, 2016

(54) IMAGE ACQUISITION SYSTEM FOR PROCESSING AND TRACKING MAIL PIECES

(71) Applicant: NEOPOST TECHNOLOGIES, Bagneux (FR)

(72) Inventor: Samira Bouzit-Benbernou, Chatenay-Malabry (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 114 days.

(21) Appl. No.: 14/149,184

(22) Filed: Jan. 7, 2014

(65) Prior Publication Data

US 2014/0211981 A1 Jul. 31, 2014

(30) Foreign Application Priority Data

Jan. 31, 2013 (EP) .................................... 13305111

(51) Int. Cl.
*G06K 9/00* (2006.01)
*G07B 17/00* (2006.01)

(52) U.S. Cl.
CPC ...... *G06K 9/00456* (2013.01); *G07B 17/00467* (2013.01); *G07B 17/00661* (2013.01); *G07B 2017/0004* (2013.01); *G07B 2017/00491* (2013.01); *G07B 2017/00669* (2013.01); *G07B 2017/00709* (2013.01)

(58) Field of Classification Search
CPC .............. Y10S 209/90; B65H 2511/13; B65H 2701/1916; B65H 2553/42; B65H 7/125; G07B 17/00661; G07B 2017/00483; G07B 2017/00677; G06K 9/00469
USPC .......................................................... 382/101
See application file for complete search history.

(56) References Cited

U.S. PATENT DOCUMENTS 3,937,456 A * 2/1976 Gruodis .................... B65H 3/44
193/8
4,500,925 A * 2/1985 Hanma .............. H04N 5/23212
348/353
5,419,440 A 5/1995 Picoult
(Continued)

FOREIGN PATENT DOCUMENTS

DE 10 2009 006 450 A1 10/2010
DE 10 2009 031 161 A1 1/2011
(Continued)

OTHER PUBLICATIONS

European Search Report for EP 13 305 111, dated Apr. 26, 2013.

*Primary Examiner* — Stephen R Koziol
*Assistant Examiner* — Shaghayegh Azima
(74) *Attorney, Agent, or Firm* — Seed IP Law Group PLLC

(57) ABSTRACT

An image acquisition system for processing and tracking mail pieces in a mailing system (2) of the type comprising at least one mail piece processing machine (4, 6, 8) comprising at least one accumulation device (14, 16) for producing mail pieces and generating electronic processing and tracking details for these mail pieces, at least one imaging device (10, 12) for acquiring images of the mail pieces, and a computer (24) coupled to the at least one imaging device and the at least one mail piece processing machine, the at least one imaging device acquiring the images of mail pieces for simultaneously providing both these processing and tracking details and a filling level of the at least one accumulation device.

20 Claims, 4 Drawing Sheets

(56) References Cited

U.S. PATENT DOCUMENTS

| | | | | |
|---|---|---|---|---|
| 5,475,603 | A * | 12/1995 | Korowotny | G07B 17/00661 209/584 |
| 5,770,841 | A * | 6/1998 | Moed | B07C 3/14 235/375 |
| 6,047,102 | A * | 4/2000 | Ohta | H04N 5/23212 348/220.1 |
| 6,122,001 | A | 9/2000 | Micaletti et al. | |
| 6,283,304 | B1 * | 9/2001 | Gottlieb | B07C 3/00 209/603 |
| 6,330,066 | B1 * | 12/2001 | Tanaka | G01B 11/0608 250/559.22 |
| 2001/0042706 | A1 * | 11/2001 | Ryan, Jr. | B07C 1/025 209/706 |
| 2003/0014376 | A1 * | 1/2003 | DeWitt | B07C 3/00 705/406 |
| 2003/0151193 | A1 * | 8/2003 | Pillard | B65H 29/16 271/303 |
| 2003/0169364 | A1 * | 9/2003 | Watanabe | G06K 9/2018 348/345 |
| 2004/0005080 | A1 * | 1/2004 | Hayduchok | B07C 3/14 382/101 |
| 2004/0140611 | A1 * | 7/2004 | Mui | B41J 11/0075 271/279 |
| 2006/0078217 | A1 * | 4/2006 | Poon | H04N 5/23212 382/255 |
| 2006/0108266 | A1 * | 5/2006 | Bowers | B07C 3/00 209/584 |
| 2007/0129957 | A1 * | 6/2007 | Elliott | G07B 17/00435 705/408 |
| 2007/0156422 | A1 * | 7/2007 | Foth | G06Q 50/32 705/336 |
| 2007/0156423 | A1 * | 7/2007 | Foth | G06Q 10/0832 709/206 |
| 2008/0158615 | A1 * | 7/2008 | Parkos | B07C 3/14 358/402 |
| 2008/0180739 | A1 * | 7/2008 | Wiersma | G07B 17/00467 358/1.15 |
| 2010/0202655 | A1 * | 8/2010 | Stegeman | B43M 3/02 382/101 |
| 2011/0184552 | A1 * | 7/2011 | Van Den Berg | B43M 3/04 700/220 |
| 2011/0192703 | A1 * | 8/2011 | Stone | B65H 7/12 198/340 |
| 2012/0182588 | A1 * | 7/2012 | Mampe | G07B 17/0008 358/3.28 |
| 2013/0198300 | A1 * | 8/2013 | Briggman | H04L 51/34 709/206 |
| 2013/0242120 | A1 * | 9/2013 | Venkatraman | H04N 5/225 348/208.4 |
| 2013/0246158 | A1 * | 9/2013 | Cannon | G06Q 10/083 705/14.36 |
| 2013/0307977 | A1 * | 11/2013 | Saporetti | G06K 7/10752 348/143 |

FOREIGN PATENT DOCUMENTS

| | | | |
|---|---|---|---|
| EP | 1 332 996 A1 | 8/2003 | |
| EP | 1 561 601 A2 | 8/2005 | |
| WO | WO 2012/110925 | * | 8/2012 |

* cited by examiner

IMAGE ACQUISITION SYSTEM FOR PROCESSING AND TRACKING MAIL PIECES

CROSS-REFERENCE TO RELATED APPLICATION

This application relates to and claims the benefit of priority from European Patent Application number 13 305 111.0, filed on Jan. 31, 2013 the entire disclosure of which is incorporated herein by reference.

FIELD OF THE INVENTION

The present invention relates to a mailing system comprising e.g. a franking, folding or sorting machine, and more particularly to its image acquisition system for processing and tracking mail pieces.

PRIOR ART

Various image acquisition systems exist for automatically reading the recipient's addresses of envelopes or parcels by performing optical character recognition on the basis of images for processing mail pieces on the fly.

U.S. Pat. No. 6,122,001 proposes an image acquisition system capable of adapting in real time to variations in the height of the top face of a parcel that can be much greater than the depth of field of the lens system of a high resolution camera (typically, variations of about 40 cm as compared with a lens system having a depth of field of 2 cm) while the parcels are travelling at about 1.7 m/s. To this end, the invention provides an image acquisition system comprising a pickup adapted to produce a signal representative of the vertical profile of the top face of each object relative to the conveyor plane, and means are provided to process the profile signal so as to produce positioning references for the focusing mechanism that serve to take account of variations in the height of the top face of each object while the object is moving beneath the lens system of the camera. The pickup is preferably a laser telemeter which presents the advantage of having a good response on surfaces of different colors, which is advantageous in a postal application.

Though this system allows to deal with various size postal matter including parcels, and permit fast and high performance sorting in image recognition processing, they could be further improved, e.g. with the provision of a filling level indication. An efficient mail processing system requires optimizing not only the image recognition processing but also the feeding, stacking, discharge and tracking of items.

OBJECT AND DEFINITION OF THE INVENTION

The object of the invention consists therefore in proposing an image acquisition system that is actually improved over the current ones used in mailing machines for franking, folding/inserting or sorting mail items.

To this end, the invention provides an image acquisition system for processing and tracking mail pieces in a mailing system of the type comprising at least one mail piece processing machine comprising at least one accumulation device for producing mail pieces and generating electronic processing and tracking details for these mail pieces, at least one imaging device for acquiring images of the mail pieces, a computer coupled to said at least one imaging device and said at least one mail piece processing machine; the image acquisition system being characterized in that said at least one imaging device acquires said images of mail pieces for simultaneously providing both these processing and tracking details and a filling level of said accumulation device.

According to a feature of the invention, the computer is incorporated in said at least one mail piece processing machine.

According to another feature of the invention, the image acquisition system further comprises at least one database coupled to said computer for storing said acquired images and/or said mail piece processing and tracking details.

In addition to allow tracking mail pieces, the reading of their faces can thus readily provide the indication of the filling level of this accumulation module on the one hand, and warn the operator that the maximum or minimum filling level is going to be reached on the other hand.

According to another feature of the invention, said at least one imaging device is an autofocus camera (or an autofocus color camera) located above said at least one accumulation device.

According to another feature of the invention, the image acquisition system comprises a calibration program for defining, adjusting, detecting, warning and indicating at least the highest filling level corresponding to a largest capacity of said at least one accumulation device and/or a lowest filling level corresponding to an empty capacity of said at least one accumulation device.

According to yet another feature of the invention, the at least one mail piece processing machine is adapted to generate a warning signal to alert the operator that a high filing and/or a low filling level of said at least one accumulation device is detected, for discharging or loading said at least one accumulation device in hidden time.

According to yet another feature of the invention, the at least one mail piece processing machine is adapted to stop when a highest filing level corresponding to a largest capacity of said at least one accumulation device is detected.

According to still another feature of the invention, the at least one mail piece processing machine is one of the following: a printing or franking apparatus and/or above a feeding device upstream this printing or franking device, a sorting machine, a folding/inserting machine and said at least one accumulation device is a feeding device or a stacking device.

According to still yet another feature of the invention, the at least one imaging device is movable alongside a mail piece conveying path of said at least one mail piece processing machine.

According to a last feature of the invention, the mail piece is a parcel of variable volume.

All these mentioned features allow to easily improve the overall processing of the mailing system without any significant adaptation while increasing its throughput.

BRIEF DESCRIPTION OF THE DRAWINGS

Other aspects, features and advantages of the present teachings will become clearer to those ordinary skilled in the art upon review of the following description of a specific preferred embodiment of the invention in conjunction with the accompanying drawings where.

DETAILED DESCRIPTION OF EMBODIMENTS

Figure 1:
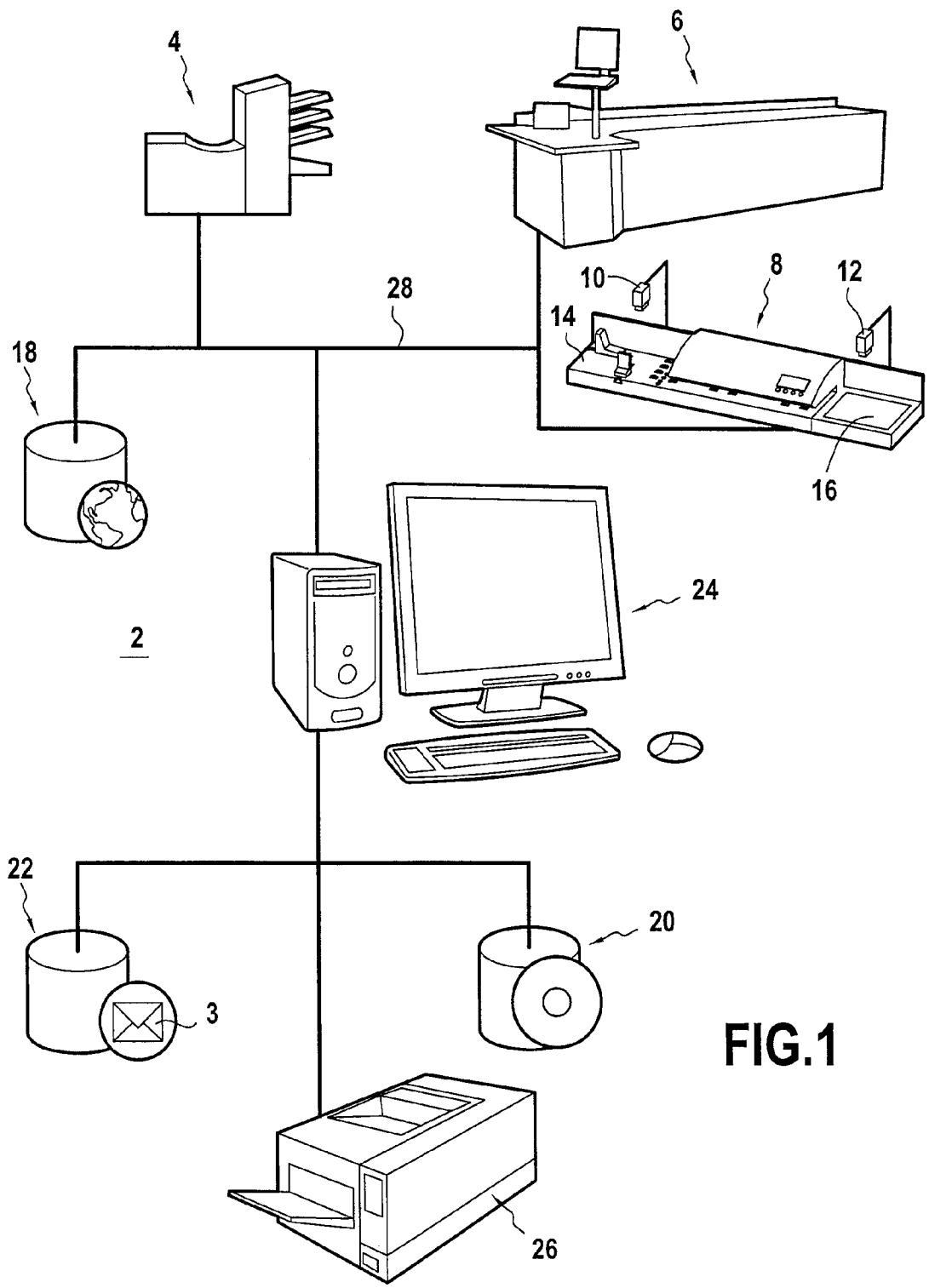
FIG. 1 shows a mailing system comprising an image acquisition system according to the invention.

The mailing system 2 on FIG. 1 comprises at least one mail piece processing machine for producing mail pieces 3 and generating electronic processing and tracking details for these mail pieces. Three typical machines are shown here in an exemplary configuration: a folder/inserter 4, a sorter 6 and a postage meter or franking machine 8. The mailing system also incorporates within these machines at least one imaging device for acquiring images of the mail pieces processed, e.g. cameras 10, 12 permanently mounted (however, a camera movable alongside a mail piece conveying path of the at least one mail piece processing machine is also conceivable) on an accumulation device such as a feeding device 14 and/or a stacking device 16 of the postage meter 8.

There is at least one database within this mailing system, e.g. a document database 20, an image acquisition database 20 and a postal service database 22. At last this system has a computer 24 associated with a documents printer 26 and which is coupled to said databases, said imaging devices and said mail piece processing machines through an electronic communication network 28 or a specialized communication line.

In operation, computer 24 uploads from document database 18 various electronic documents that might contain e.g. addresses and barcodes and the printer 26 connected to this computer prints these documents. Folder-inserter 4 folds and inserts the printed documents into envelopes and the filled envelopes which could also be closed are sent to sorter 6. They are then loaded in batches in feeding device 14 of franking machine 8 and franked before to be accumulated in the stacking device 16.

The camera 10, preferably an autofocus camera or color camera, incorporated the feeding device 14 automatically focuses on the top face of upper mail tem 3 of the loaded batch. Camera focus point is at once adjusted.

Focus value FV is extracted via software in computer 24 and analyzed by comparing it to the focus value FVmin of the feeding device at its minimum capacity, pre-defined in an initial calibration program. The filling level is thus obtained, which allows to trigger warning signals for slowing down the conveying speed and loading the feeding device without stopping the mailing system.

Filled envelopes 3 are selected in the singulating module, eventually weighed on the fly in dynamic weighing device when such a device is present and franked in franking module before falling in the bin of the stacking device 16 under the camera 12 incorporated in this device.

Figure 2:
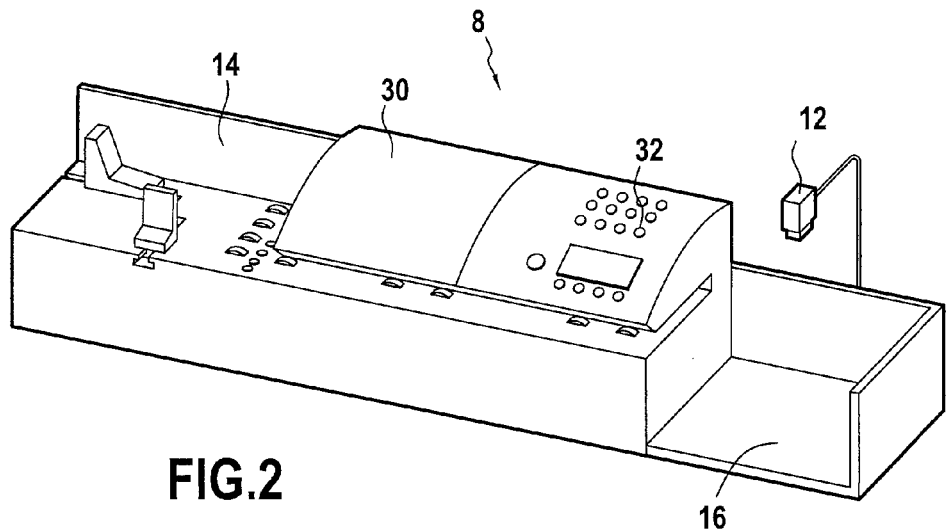
FIGS. 2 and 4 show two embodiments of the franking machine within the mailing system of FIG. 1.

A first embodiment of the present invention focuses in particular on the postage meter 8 as illustrated on FIG. 2. This postage meter classically comprises the feeding device 14 with its singulating module 30 conventionally located upstream a franking module 32 that is positioned upstream of the stacking device 16 comprising, according to the invention, an imaging device such as a camera 12. This postage meter can incorporate a computer and a database coupled to the imaging device. All these elements are located on a work table (shown in FIG. 4 as reference 19) or arranged on one of its sides in order to be easily available to an operator in charge of the franking operations and generally in position in front of this table.

Figure 3:
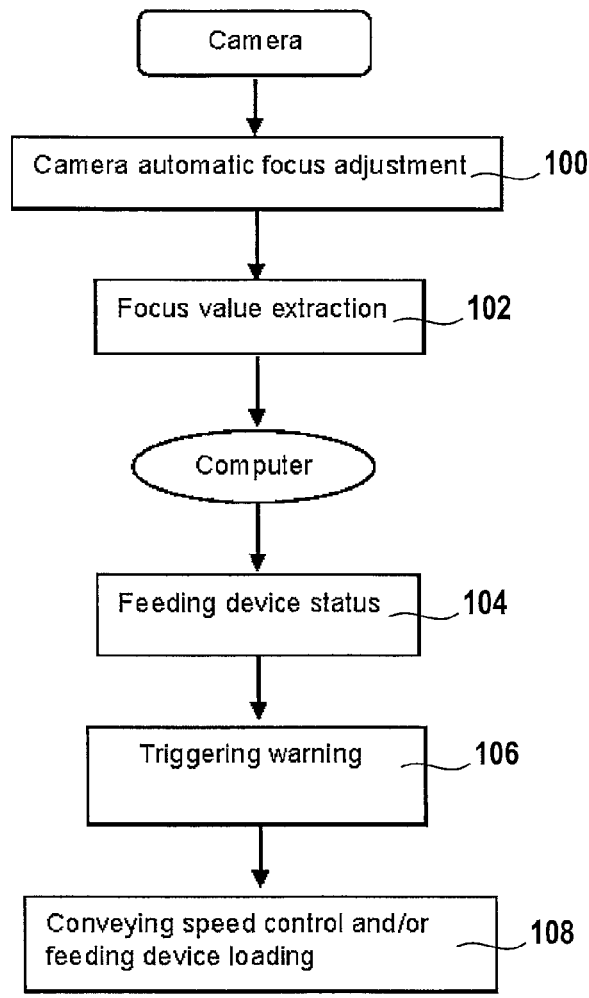
FIG. 3 is a flowchart depicting the operating phases of the image acquisition process within the feeding device of the franking machine represented on FIG. 2.

The operating phases of the image acquisition process within the accumulation device are illustrated in FIG. 3. The camera focus point is automatically adjusted in a step 100 and the resulting image of the physical mail piece is captured for providing processing and tracking information details. In a step 102, the focus value FV is extracted using computer software and analysed by comparing it to the pre-known focus value FVmax of the stacking device at its maximum capacity, determined during the previous initial calibration step. The filling level can be determined and displayed in a step 104. Visual or sound warning signals can also be triggered in a step 106 for slowing down or annulling the conveying speed of the envelopes and unloading the stacked batch of envelopes (step 108).

The captured image is sent to computer 24 in view of various processing steps including the optical recognition of the recipient address, the decoding of any available barcode, the archiving and reporting of information data to the postal service database 22. Captured images and their different related process steps or events are stored in the image acquisition database 20.

Figure 4:
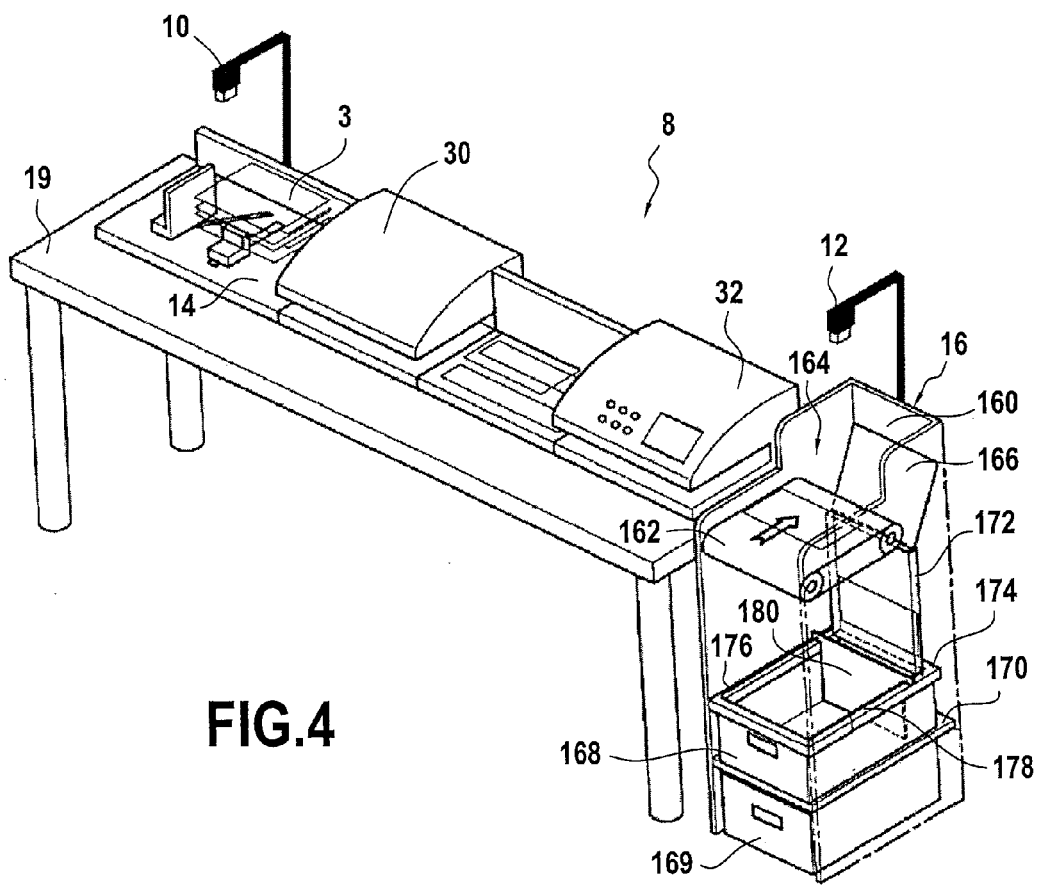
Figure 5:
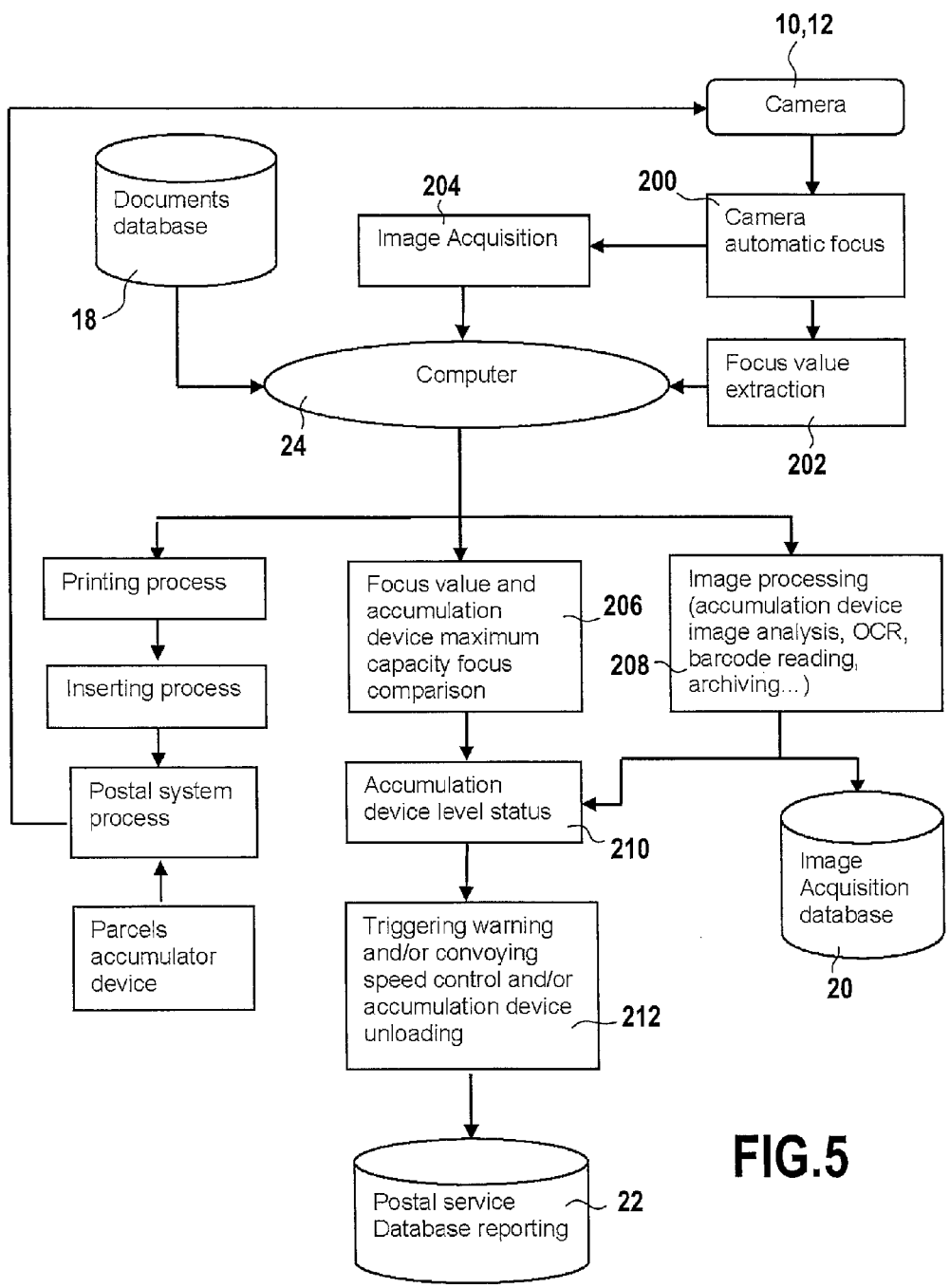
FIG. 5 is a flowchart depicting the operating method of the image acquisition system within the mailing system of FIG. 1.

A second embodiment is illustrated in FIGS. 4 and 5, in which the stacking device 16 now presents a vertical modular architecture as described e.g. in patent EP 1332996 filed in the name of the applicant. It comprises a first module (or column 160) comprising a conveyor belt 162 for successively receiving the envelopes ejected by the franking module 32 of the machine and conveying them towards the rear of the work table perpendicularly to their direction of ejection (which is also the direction of advance of these envelopes) towards an opening 164 in which they will drop one by one in order to be directed along an inclined surface 166 which ensures transfer of these envelopes towards a first postal storage bin 168 of standard dimensions, arranged in the column beneath the conveyor belt on a shelf 170 of the module. Such inclination of the transfer surface makes it possible to straighten up the mail items which were initially in a horizontal position and therefore to stow them vertically (edgewise) in the postal bin (this vertical position is required by the Postal Service in order to facilitate the subsequent sorting operations carried out by this Administration).

To allow easy arrangement and to guide the envelopes in their descent towards the post bin 168, the stacking device comprises a guiding gutter 172 mounted directly at the exit of the inclined surface and whose width corresponds to the largest format of the franked envelopes. This gutter is associated with a frame 174 intended to be applied on the upper peripheral edge of the postal bin and comprising two parallel guides 176, 178 on which is suspended a pushing plate 180 intended to change position as the envelopes are received and therefore as the bin is filled. It will be noted that, in order to limit the time of interruption of the franking process, the receiving device preferably comprises two superposed postal bins 168, 169. In this way, once it is full, the operator can remove the corresponding bin from the module (such removal may be facilitated by replacing the shelf 170 by a drawer on runners), take off the frame which surmounts it (a flat spiral spring system may in that case allow, for example, the divider to return into its initial position), and place it on the second empty bin which can be positioned in place of the first bin in order to continue the franking process.

Once an envelope 3i arrives on the conveyer belt 162, first autofocus point is automatically adjusted by camera 12 (step 200) and as previously explained a focus value is extracted (step 202) as well as an image of the physical mail piece is captured (step 204) for providing processing and tracking information details.

Figure 6:
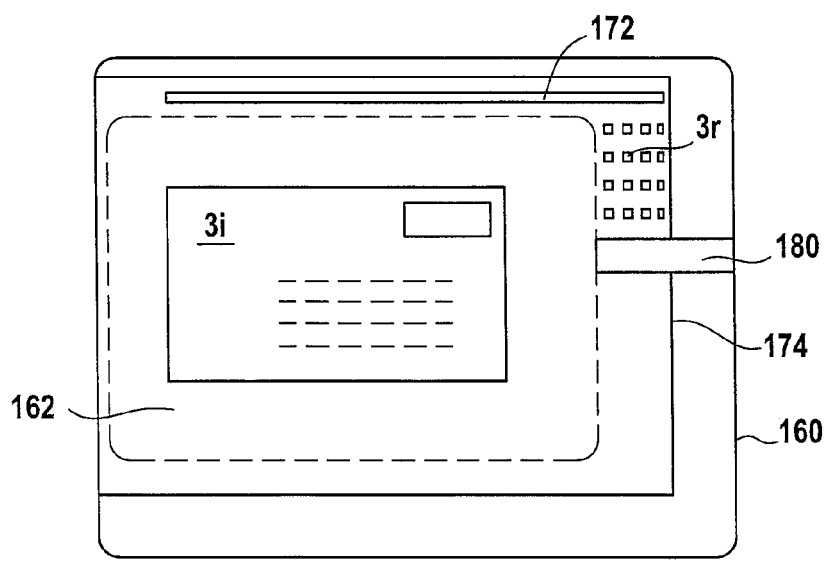
FIG. 6 is a partial top view of the stacking device illustrated on FIG. 4.

As depicted on FIG. 6, the captured image also contains an apparent side of the stacking device 16 and part of its pushing plate 180 located under the conveyer belt 162, and not hidden by the conveyer belt 162. Within this side appear the guiding gutter 172, the end parts of stacked envelopes 3n and the end part of pushing plate 180. Filters are applied to this image to determine the position of the pushing plate 180 relative to a reference plane. This position is then compared to a reference position value that represents the postal bin at its maximum capacity, pre-defined during a calibration step (step 206).

The image is sent to computer 24 in view of various processing steps including an analysis of the apparent accumulation device, an automatic optical recognition of the recipient address, the decoding of any available barcode, the archiving and reporting of information data to the postal service database 22 (step 208). An accumulation device level status is done (step 210) and captured images and their different related process steps or events are stored in the image acquisition database 20.

Finally camera 12 allows triggering warning signals for slowing down the conveying speed and/or removing a postal bin ready to dispatch without stopping the mailing process (step 212). It also permits saving a visual or sound sensor on the frame and/or the divider to warn the operator of the presence of a full bin.

Of course the mailing process could also be automatically programmed for stopping if needed for loading or discharging purposes. A color camera provides more processing possibilities such as improved image recognition, authentication and sorting.

The image acquisition of the present invention can also be applied to the field of parcel shipping. Images of parcels of variable volume can be captured for processing and tracking purposes and indication of filling levels as well.

The invention claimed is:

1. A mailing system comprising:
at least one mail piece processing machine comprising at least one accumulation device for producing mail pieces and generating electronic processing and tracking details for these mail pieces; and
at least one imaging device for acquiring images of the mail pieces;
a computer coupled to said at least one imaging device and said at least one mail piece processing machine;
wherein said at least one imaging device for acquiring said images of the mail pieces comprises means for simultaneously providing both these processing and tracking details produced by said at least one piece processing machine and a focus value FV which once compared with a predefined focus value delivers a filling level of said at least one accumulation device.

2. A mailing system according to claim 1, wherein said computer is incorporated in said at least one mail piece processing machine.

3. A mailing system according to claim 1, further comprising at least one database coupled to said computer for storing said acquired images and/or said mail piece processing and tracking details.

4. A mailing system according to claim 1, wherein said at least one imaging device is an autofocus camera located above said at least one accumulation device.

5. A mailing system according to claim 1, wherein it comprises a calibration program stored in at least one nontransitory computer-readable medium for defining, adjusting, detecting, warning and indicating at least a highest filling level corresponding to a largest capacity of said at least one accumulation device and/or a lowest filling level corresponding to an empty capacity of said at least one accumulation device.

6. A mailing system according to claim 5, wherein said at least one mail piece processing machine is adapted to generate a warning signal to alert the operator that a high filling and/or a low filling level of said at least one accumulation device is detected, for discharging or loading said at least one accumulation device in hidden time.

7. A mailing system according to claim 5, wherein said at least one mail piece processing machine is adapted to stop when a highest filling level corresponding to a largest capacity of said at least one accumulation device is detected.

8. A mailing system according to claim 6, wherein said warning signal triggers a direct unloading of the mail pieces into postal bins ready for dispatch.

9. A mailing system according to claim 1, wherein said at least one mail piece processing machine is one of the following: a printing or franking device, a sorting machine, a folding/inserting machine.

10. A mailing system according to claim 1, wherein said at least one accumulation device is a feeding device or a stacking device.

11. A mailing system according to claim 1, wherein said at least one imaging device is movable alongside a mail piece conveying path of said at least one mail piece processing machine.

12. A mailing system according to claim 1, wherein said at least one imaging device is an autofocus color camera.

13. A mailing system according to claim 1, wherein the mail piece is a parcel of variable volume.

14. A system comprising:
an imager having a field of view and an adjustable focus, the imager positioned such that the field of view of the imager encompasses at least a portion of a topmost mail piece in an accumulator which holds at least two stacked mail pieces, the imager focuses on the topmost mail piece, acquires at least one image of at least the portion of the topmost mail piece, provides processing and tracking details of the topmost mail piece, and provides a focus value FV corresponding to a focus level of the adjustable focus of the imager when focused on the topmost mail piece; and
at least one processor coupled to the imager, the at least one processor receives the focus value FV from the imager, compares the focus value FV to a predefined focus value, generates a result of comparison of the focus value FV to the predefined focus value, and determines a filling level of the accumulator based at least in part on the result of the comparison of the focus value FV to the predefined focus value.

15. A system according to claim 14, wherein the at least one processor is incorporated in at least one mail piece processing machine.

16. A system according to claim 14, wherein the imager is an autofocus camera located at least partially above the accumulator.

17. A system according to claim 14, further comprising at least one nontransitory computer-readable medium storing at least one calibration program that when executed by the at least one processor causes the at least one processor to define, adjust, detect, warn, and indicate at least a highest filling level corresponding to a largest capacity of the accumulator and/or at least a lowest filling level corresponding to an empty capacity of the accumulator.

18. A system according to claim 17, further comprising a mail piece processing machine, the mail piece processing machine generates a warning signal to alert an operator of a high filling and/or a low filling level of the accumulator in response to an indication from the at least one processor.

19. A system according to claim 18, wherein the warning signal triggers a direct unloading of mail pieces into postal bins ready for dispatch.

20. A system according to claim 17, further comprising a mail piece processing machine, the mail piece processing machine stops in response to detection of the highest filling level corresponding to the largest capacity of the accumulator.

* * * * *